UNITED STATES PATENT OFFICE.

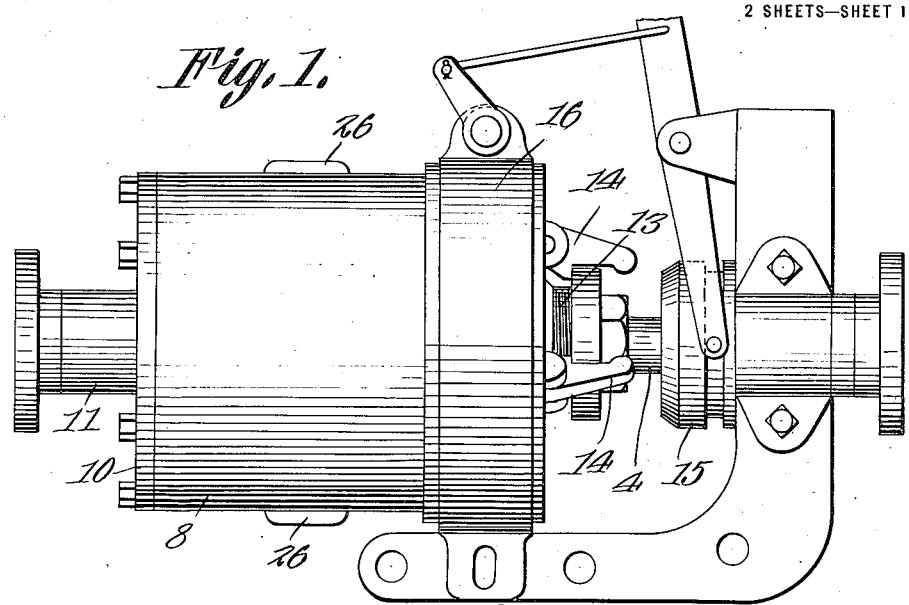

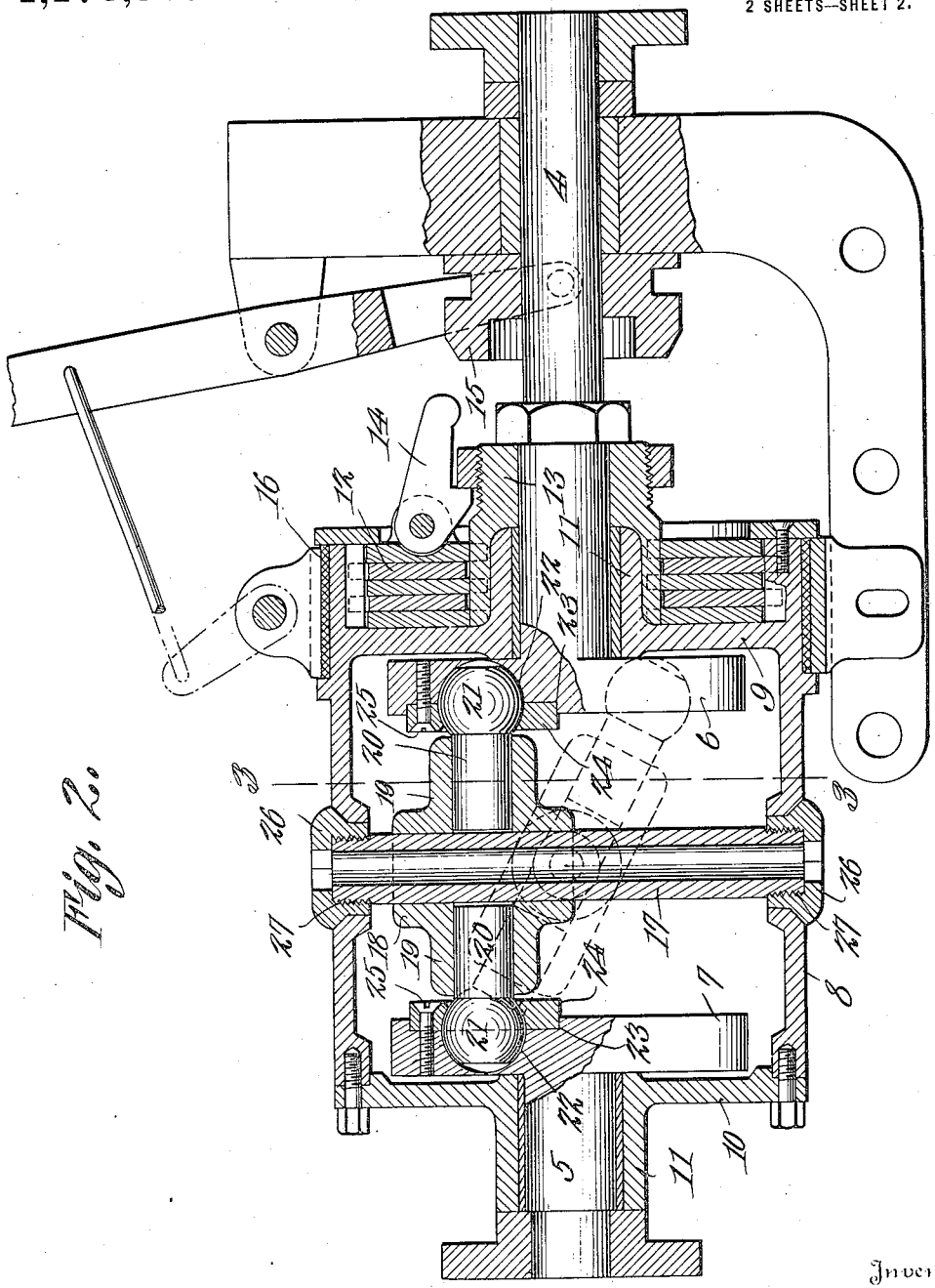

RALPH GERBER, OF RAYMOND, WASHINGTON.

POWER-TRANSMISSION MECHANISM.

1,173,567. Specification of Letters Patent. Patented Feb. 29, 1916.

Application filed June 1, 1915. Serial No. 31,432.

*To all whom it may concern:*

Be it known that I, RALPH GERBER, a citizen of the United States, residing at Raymond, in the county of Pacific and State of Washington, have invented certain new and useful Improvements in Power-Transmission Mechanism, of which the following is a specification.

This invention relates to mechanism for transmitting power from a driving shaft to a driven shaft, and its object is to provide a novel and improved mechanism of this kind which accomplishes the purpose for which it is designed without the use of gears, sprocket wheels and chains, and which can be set to transmit motion in either direction.

The object stated is attained by means of a combination and arrangement of parts to be hereinafter described and claimed, and in order that the invention may be better understood, reference is had to the accompanying drawings, in which—

Figure 1 is a side elevation of the mechanism; Fig. 2 is a central longitudinal section thereof, and Fig. 3 is a cross section on the line 3—3 of Fig. 2.

Referring specifically to the drawings, 4 and 5 respectively, denote two axially alined shafts having their adjacent ends spaced and provided thereat with cranks 6 and 7, respectively, said cranks being also spaced. The crank ends of the shafts are inclosed in a cylindrical housing 8 closed at its ends by heads 9 and 10, respectively, said heads being provided with bearing hubs 11 for the shafts. The head 9 is integral with the housing, and the head 10 is bolted or otherwise removably connected to the housing. The outer face of the head 9 is formed with a chamber in which are located the friction rings or plates 12 of a multiple-plate friction clutch. Alternate plates are fixed to the head 9, and the intervening plates are fixed to a hub 13 fast on the shaft 4. This is a well-known type of clutch, and a further description thereof is therefore deemed unnecessary. The housing 8 is loose on the shafts 4 and 5, and upon applying the clutch it is locked to the shaft 4 to turn therewith. The friction plates 12 are pressed together by levers 14 actuated by a cone sleeve 15 slidably mounted on the shaft 4; and provided with a suitable operating lever. Any other suitable clutch mechanism may be provided for coupling the housing 8 to the shaft 4. A brake is also provided so that the housing 8 may be held stationary with respect to the shafts 4 and 5. This brake may be an ordinary band brake 16 applied to one end of the housing.

The following mechanism is provided for transmitting the motion of the shaft 4 to the shaft 5: Midway between the cranks 6 and 7, the housing 8 carries a transverse spindle 17 which is tubular and intersects the axis of the shafts 4 and 5 at a right angle. On this spindle is mounted a sleeve 18 which is free to slide lengthwise on the spindle and also to rock thereon. The sleeve has outstanding, diametrically opposite side arms 19 which are hollow, and in each of these arms is loosely mounted a cylindrical stem 20 having a spherical head 21 at its outer end. One of the heads 21 is connected to the crank 6, and the other head is connected to the crank 7, the connection being such that a ball-and-socket joint is produced. As shown, the crank faces have partly spherical sockets 22 in which the heads 21 seat. The sockets 22 have countersinks 23 to receive retaining rings 24 which are secured to the cranks by screws 25. The stems 20 are free to slide and turn in the hollow of the arms 19. The spindle 17 is fixed to the housing 8 to turn therewith, and it does not turn on its own axis. The housing has, on diametrically opposite sides, openings in which seat plugs 26 which are tapped to receive the threaded ends 27 of the spindle, whereby the latter is secured to the housing.

In operation, when the clutch 11 is released, and the brake 16 is applied, the housing is held stationary, and the motion of the shaft 4 will be transmitted in a reverse direction to the shaft 5, through the cranks 6 and 7 and the driving connection therebetween consisting of the parts 18, 20 and 21. The sleeve 16 now slides back and forth on the spindle 17 and also rocks thereon. The sliding connection of the stems 20 with the arms 19 of the sleeve 18 allows for the oblique position the stems assume relative to the cranks as the sleeve rocks on the spindle. To transmit motion to the shaft 5 in the same direction the shaft 4 is turning, the brake 16 is released to free the housing 8, and the clutch 11 is applied to couple the housing to the shaft 4. The housing now turns with the shaft 4 and transmits motion to the shaft 5 through the spindle 17, and the parts 18, 20 and 21 connecting the cranks 6 and 7, said connection being now rigid and turning bodily with the housing.

The mechanism provides a simple and highly efficient reversing power transmission device, dispensing with gears, sprocket wheels and chains, and suitable for various purposes.

The device will be constructed in different sizes to suit the power required, and the friction clutch can be changed to conform to the particular machine or other part to be driven.

The embodiment of the invention as shown in the drawings is a marine type of the device, but the design may be varied for other applications of the device.

The power or driving shaft is the shaft 4 and the driven shaft is the shaft 5, but this arrangement may be reversed.

Other changes and modifications will readily suggest themselves to those skilled in the art to which the invention relates.

I claim:

1. In a power transmission mechanism, axially alined shafts spaced at their adjacent ends and having cranks thereat, a loose housing inclosing the crank ends of the shafts, a transverse spindle carried by the housing between the crank ends of the shafts and intersecting the axis of the shafts, a sleeve loose on the spindle and free to slide and rock thereon, diametrically opposite hollow arms extending sidewise from the sleeve, stems slidably mounted in the hollow of the arms, ball-and-socket connections between the stems and the respective cranks, the cranks having sockets, and the stems having spherical outer ends seating partly in said sockets, and retaining rings carried by the cranks and engaging the spherical ends of the stems outside the sockets.

2. In a power transmission mechanism, axially alined shafts spaced at their adjacent ends and having cranks thereat, a transverse spindle between the crank ends of the shafts and intersecting the axis of the shafts, a support for the spindles, means for holding the support stationary relative to the spindle, means for coupling the support to one of the shafts, a sleeve loose on the spindle and free to slide and rock thereon, diametrically opposite hollow arms extending sidewise from the sleeve, stems slidably mounted in the hollow of the arms, ball-and-socket connections between the stems and the respective cranks, the cranks having sockets, and the stems having spherical outer ends seating partly in said sockets, and retaining rings carried by the cranks and engaging the spherical ends of the stems outside the sockets.

In testimony whereof I affix my signature in presence of two witnesses.

RALPH GERBER.

Witnesses:
CLAUDE HOUSE,
J. T. MORRIS.